United States Patent
Lu et al.

(10) Patent No.: US 9,598,127 B2
(45) Date of Patent: Mar. 21, 2017

(54) SIDE STAND

(71) Applicant: GOGORO INC., George Town (KY)

(72) Inventors: Chien-Cheng Lu, New Taipei (TW); Chia-Hao Chang, New Taipei (TW)

(73) Assignee: GOGORO INC., George Town, KY (US)

( * ) Notice: Subject to any disclaimer, the term of this patent is extended or adjusted under 35 U.S.C. 154(b) by 0 days.

(21) Appl. No.: 14/925,739

(22) Filed: Oct. 28, 2015

(65) Prior Publication Data
US 2016/0200380 A1 Jul. 14, 2016

Related U.S. Application Data

(60) Provisional application No. 62/069,661, filed on Oct. 28, 2014.

(51) Int. Cl.
*A63B 55/57* (2015.01)
*B62D 1/00* (2006.01)
*B62H 1/02* (2006.01)
*B62B 1/00* (2006.01)

(52) U.S. Cl.
CPC .............. *B62H 1/02* (2013.01); *A63B 55/57* (2015.10); *B62B 1/008* (2013.01)

(58) Field of Classification Search
CPC ... B62H 1/04; B62H 1/02; B62H 3/04; B62H 3/08; B60R 3/02; B62J 25/00; A63B 55/50; A63B 55/57; B62B 1/008
USPC ...................................................... 244/102 A
See application file for complete search history.

(56) References Cited

U.S. PATENT DOCUMENTS

| | | | | |
|---|---|---|---|---|
| 2,388,365 A | * | 11/1945 | Nevin ..................... | B64C 25/16 244/102 R |
| 2,552,843 A | * | 5/1951 | Clifton .................... | B64C 25/22 244/102 R |
| 2,741,446 A | * | 4/1956 | Jakimiuk ................. | B64C 25/52 244/102 R |
| 3,387,802 A | * | 6/1968 | Cruz ....................... | B64C 25/52 244/102 R |
| 4,223,906 A | * | 9/1980 | Gratza ..................... | B62H 1/02 180/219 |
| 4,408,736 A | * | 10/1983 | Kirschbaum ........... | B64C 25/32 244/100 R |
| 4,845,804 A | * | 7/1989 | Garrett .................... | B60B 33/06 16/19 |

(Continued)

FOREIGN PATENT DOCUMENTS

| | | | | |
|---|---|---|---|---|
| FR | 2957891 A1 | * | 9/2011 | ............... B62H 1/04 |
| JP | 04339083 A | * | 11/1992 | |

(Continued)

*Primary Examiner* — Joseph Rocca
*Assistant Examiner* — Daniel Yeagley
(74) *Attorney, Agent, or Firm* — Perkins Coie LLP

(57) ABSTRACT

Provided is a side stand for supporting a two-wheeled vehicle on a ground. The side stand comprises a first link, a second link and a stand. The first link has two ends respectively pivoted to a base part of the two-wheeled vehicle and the stand. The second link also has two ends respectively pivoted to the base part of the two-wheeled vehicle and the stand. The stand has a lower end, and a pivot end where the first and second links and are pivoted to. The lower end of the stand abuts against the ground when the stand is in an open state.

10 Claims, 8 Drawing Sheets

(56) References Cited

U.S. PATENT DOCUMENTS

| | | | | |
|---|---|---|---|---|
| 5,118,126 A * | 6/1992 | Yaple | ............... | B62H 1/02 |
| | | | | 180/219 |
| 5,875,994 A * | 3/1999 | McCrory | ............... | B64C 25/20 |
| | | | | 244/102 A |
| 6,182,981 B1 * | 2/2001 | Kuo | ............... | A45C 5/14 |
| | | | | 190/18 A |
| 6,715,282 B1 * | 4/2004 | Doveri | ............... | B62H 1/02 |
| | | | | 280/764.1 |
| 7,850,187 B1 * | 12/2010 | Ford | ............... | B62H 1/00 |
| | | | | 280/293 |
| 8,033,369 B2 * | 10/2011 | Sherrell | ............... | A45C 5/146 |
| | | | | 190/18 A |
| 8,434,714 B2 * | 5/2013 | Ekmedzic | ............... | B64C 25/10 |
| | | | | 244/100 R |
| 8,764,030 B1 * | 7/2014 | Murphy | ............... | A63B 55/00 |
| | | | | 280/47.17 |
| 2011/0049293 A1 * | 3/2011 | Koletzko | ............... | B64C 25/52 |
| | | | | 244/102 A |

FOREIGN PATENT DOCUMENTS

| | | | |
|---|---|---|---|
| JP | 2001097260 A * | 4/2001 | |
| JP | 2009202723 A * | 9/2009 | |

* cited by examiner

SIDE STAND

CROSS-REFERENCE SECTION TO RELATED APPLICATION(S)

This application claims the benefit of U.S. Provisional Application No. 62/069,661 filed Oct. 28, 2014, and incorporated herein by reference in its entirety.

TECHNICAL FIELD

The present invention relates to a side stand, and more particularly to a side stand for supporting a two-wheeled vehicle.

BACKGROUND

Two-wheeled vehicles, such as bicycles and motorcycles, cannot balance merely on its two wheels when parked, while leaving them fallen on the ground causes damages to the vehicles, and thus two-wheeled vehicles are often equipped with a side stand for supporting the two-wheeled vehicles when being parked. The side stand adds a supporting point outside the line passing through the two points of support on the two wheels, and the stability of stand of a two-wheeled vehicle would be improved when the two-wheeled vehicle is parked.

Since the configuration of the side stand does not substantially affect the functionality of the vehicle, in designing a two-wheeled vehicle, a side stand is mostly additionally installed from the outside of the main body or frame of the two-wheeled vehicle as an appended part. However, as shown in FIGS. 1 and 2, such design results not only in that a conventional side stand 400 appears redundant with respect to the overall appearance of the vehicle, but also in that the protrusion of the conventional side stand 400 out of the vehicle would cause troubles if it happens to collide or entangle with something.

On the other hand, some two-wheeled vehicles may include a housing body to cover its main frame and mechanical parts. The housing body not only reduces the drag and improves driving stability by its streamlined appearance, but also protects the mechanical parts from air, dust and surface water. However, to equip a vehicle with the conventional side stand 400 mentioned above, a corresponding space is required on the housing body and inevitably causes the housing body to have one or more gaps thereon, through which the airflow could enter the inside of the housing body unhindered, largely compromising the effects of the housing body on improving the driving stability and protecting the mechanical parts.

In view of the foregoing, there is still a need in the art for an improved side stand for supporting a two-wheeled vehicle, which in its collapsed state would not reduce the effects of the housing body on improving the driving stability and protecting the mechanical parts.

DETAILED DESCRIPTION

The present invention provides a side stand, which in its lower state can support a two-wheeled vehicle, and in its collapsed state can incorporate into the housing body to form a smooth appearance, not only reducing the drag and improving driving stability but also helping prevent air, dust and surface water from entering the inside of the housing body through the gaps thereon, and further making the two-wheeled vehicle in a better appearance.

The present invention provides a side stand pivotally mounted to a base part of a two-wheeled vehicle for supporting the two-wheeled vehicle on a ground, wherein the two-wheeled vehicle has a housing body. The side stand includes a first link, a second link and a stand. The first link has a first end and a second end, and the first end of the first link is pivoted to the base part of the two-wheeled vehicle. The second link has a first end and a second end, and the first end of the second link is pivoted to the base part of the two-wheeled vehicle. The stand has a lower end, and a pivot end where the first end of the first link and the first end of the second link are pivoted to. When the stand is in a closed state (the side stand of the present invention is correspondingly in a collapsed state), the stand incorporates into the housing body of the two-wheeled vehicle. When the side stand is in a propping state, the lower end of the stand abuts against the ground.

The detailed technology and preferred embodiments implemented for the subject invention are described in the following paragraphs accompanying the appended drawings for people skilled in this field to well appreciate the features of the claimed invention.

Figure 1:
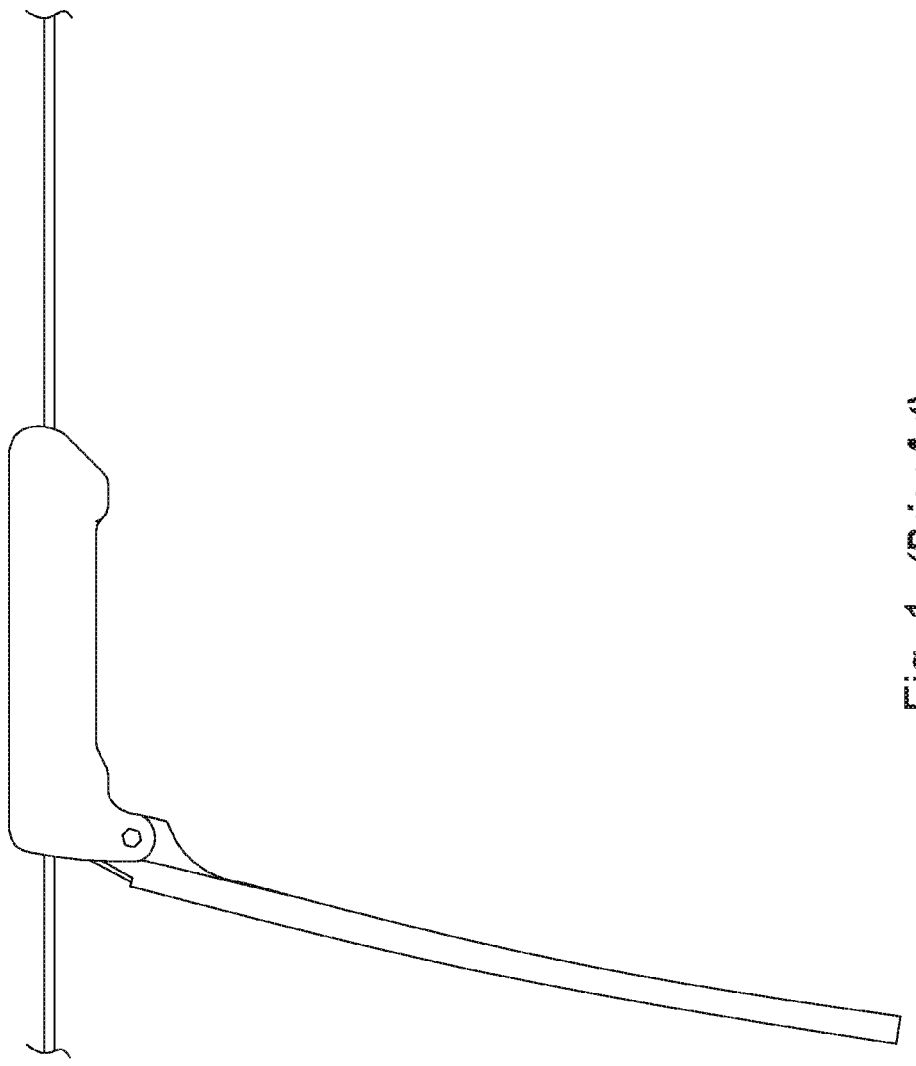
FIG. 1 is a schematic view illustrating a conventional side stand in a propping state.
Figure 2:
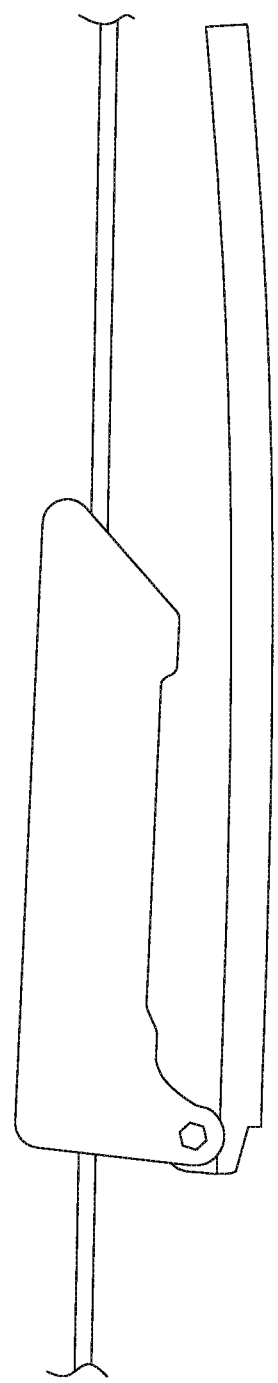
FIG. 2 is a schematic view illustrating a conventional side stand in a collapsed state.
Figure 3:
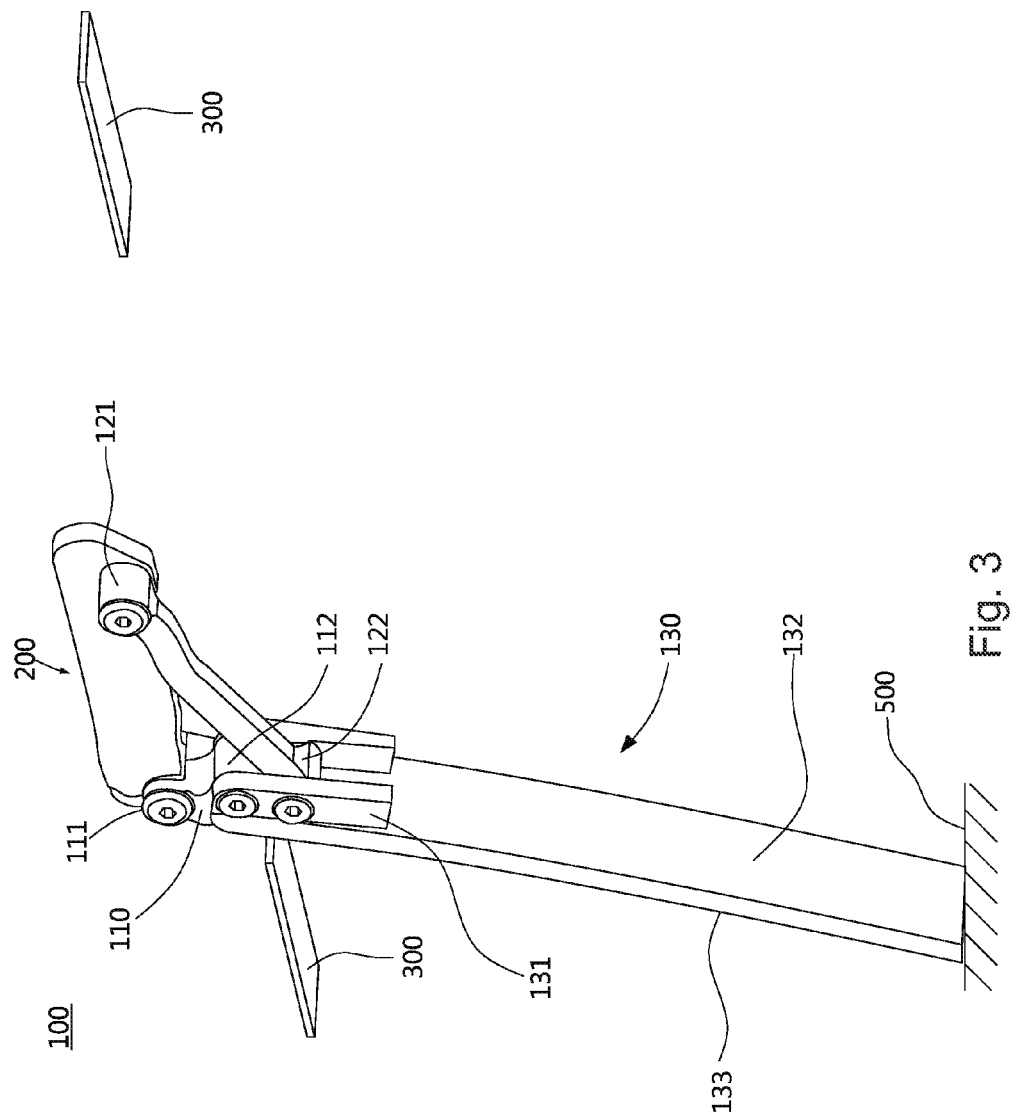
FIG. 3 is a perspective view illustrating a side stand in a propping state, in accordance with one embodiment of the present invention.
Figure 4:
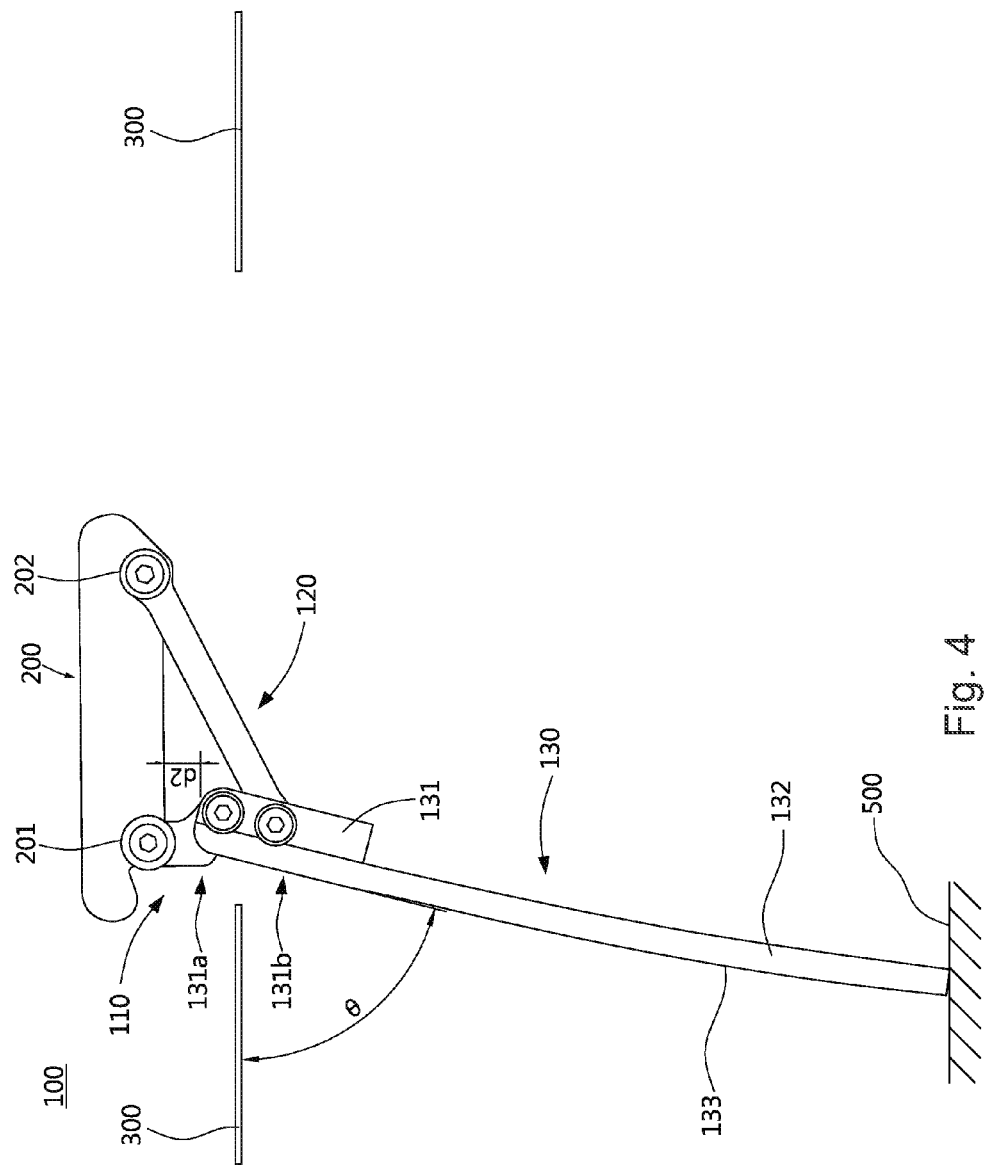
FIG. 4 is a top schematic view illustrating a side stand in a propping state, in accordance with one embodiment of the present invention.

FIG. 3 is a perspective view of a side stand in a propping state according to one embodiment of the invention, and FIG. 4 is a top schematic view of a side stand in a propping state according to one embodiment of the invention. As shown in FIGS. 3 and 4, a side stand 100 for use in a two-wheeled vehicle can be pivotally mounted on a base part 200 of the two-wheeled vehicle, to provide side support for the two-wheeled vehicle on a ground 500 when the two-wheeled vehicle is parked.

"Two-wheeled vehicle" as used herein refers generally to a bicycle, a motorcycle or other two-wheeled non-powered/powered machinery, which requires a stand to support it on the ground when the vehicle is parked. In one embodiment, said side stand 100 is configured to be pivotally mounted on a base part 200 of a two-wheeled vehicle. The base part 200 can be a part of the main body of the two-wheeled vehicle which is located adjacent the ground 500. For example, the base part 200 may be disposed at a connecting portion (not shown) of the two-wheeled vehicle between its two wheels.

The connecting portion is adjacent to the position of the feet of a driver riding the two-wheeled vehicle. For example, said connecting portion may form one or more foot resting parts allowing a driver to put his or her feet thereon when he or she is riding the two-wheeled vehicle, but the invention is not limited to such an embodiment. In some embodiments, the base part 200 may be disposed on the body or main body of the two-wheeled vehicle. In some embodiments, the base part 200 may be disposed on the frame of the two-wheeled vehicle.

The side stand 100 includes a first link 110, a second link 120, and a stand 130. The first link 110 has a first end 111 and a second end 112. The second link 120 has a first end 121 and a second end 122. Said first ends 111 and 121 are respectively pivoted to the base part 200 at different positions. The stand has a pivot end 131 and a lower end 132, wherein the second end 112 of the first link 110 and the second end 122 of the second link 120 are pivoted to the pivot end 131.

In one embodiment, the stand 130 can be opened or closed, which may correspond to a propping state or a collapsed state of the side stand 100 respectively. For example, as shown in FIGS. 3 and 4, when the stand 130 is moved in a direction opposite to the housing body 300 (i.e., the lower end 132 of the stand 130 is moved away from the housing body 300), the stand 130 is changed to an open state (i.e., the stand 130 is opened) and the side stand 100 is accordingly changed to an propping state. In such state, the lower end 132 of the stand 130 can contact the ground 500, such that the side stand can keep the two-wheeled vehicle upright on the ground 500.

Figure 5:
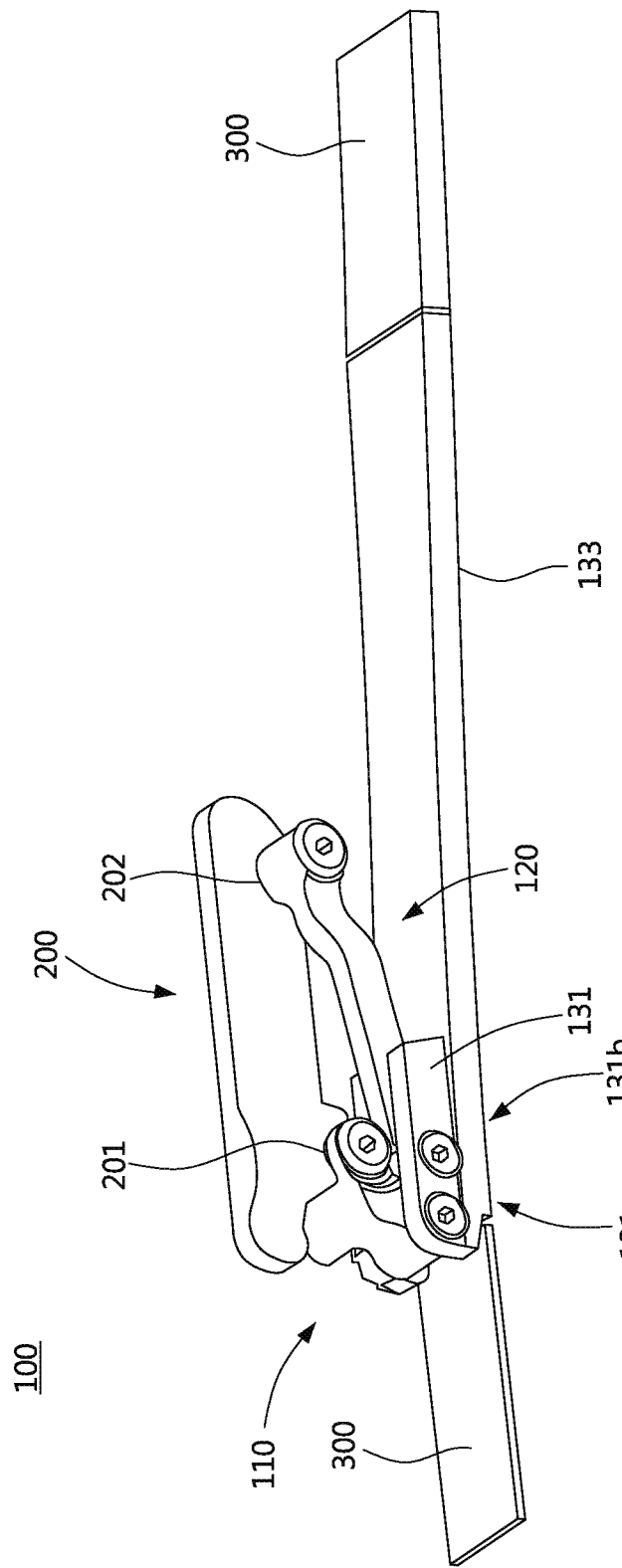
FIG. 5 is a perspective view illustrating a side stand in a collapsed state, in accordance with one embodiment of the present invention.
Figure 6:
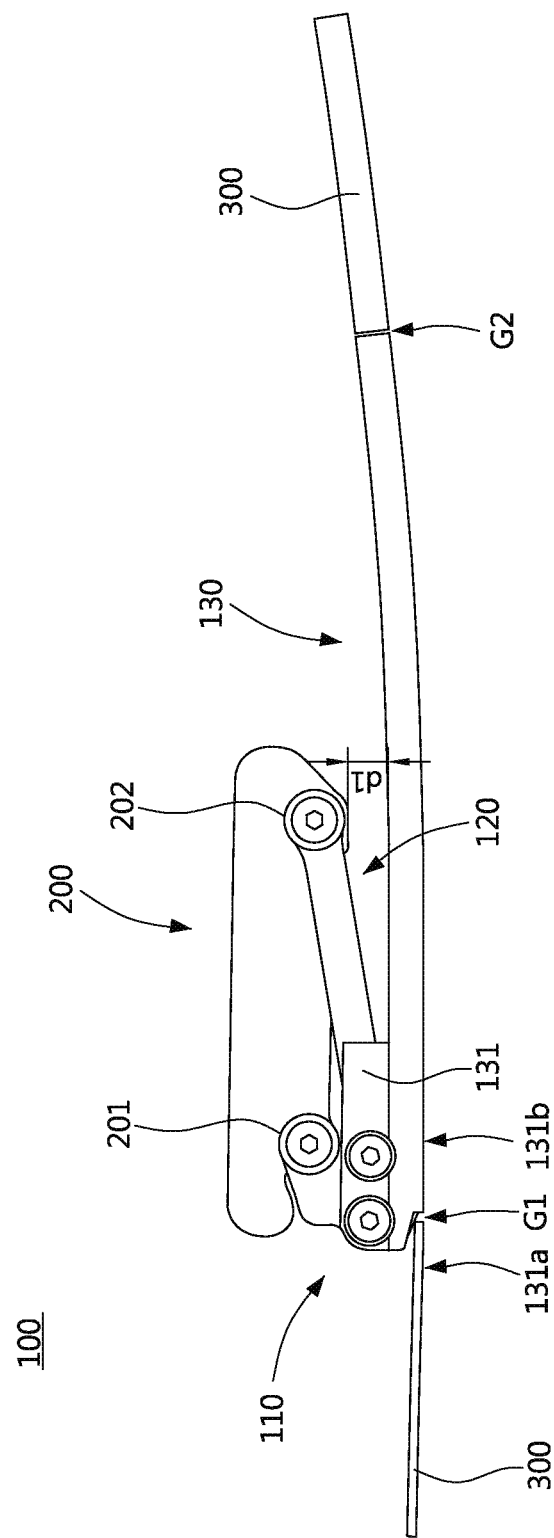
FIG. 6 is a top schematic view illustrating a side stand in a collapsed state, in accordance with one embodiment of the present invention.

FIGS. 5 and 6 respectively illustrate a perspective view and a top schematic view of a side stand in a collapsed state according to one embodiment of the invention. As shown in FIGS. 5 and 6, when the stand 130 is moved in away from the ground 500 and in a direction toward the two-wheeled vehicle to combine with the housing body 300 (i.e., the lower end 132 of the stand 130 is moved closely adjacent to the housing body 300), the stand 130 is changed to an closed state (i.e., the stand 130 is closed) and the side stand 100 is changed to a collapsed state. In such state, the stand 130 is combined with the housing body 300 to form a smooth appearance of the housing body 300.

The pivot end 131 of the stand 130 is used to pivotally connect with the first link 110 and the second link 120. Specifically, the pivot end 131 of the stand 130 may include a first section 131*a* and a second section 131*b*. When the whole stand 130 is considered, the section of the pivot end 131 which is more distant from the center of gravity of the stand 130 is the first section 131*a*, and the section which is less distant from to the center of gravity of the stand 130 is the second section 131*b*. The second end 112 of the first link 110 may be pivoted to the first section 131*a* of the pivot end 131, and the second end 122 of the second link 120 may be pivoted to the second section 131*b* of the pivot end 131.

On the other hand, the first end 111 of the first link 110 and the first end 121 of the second link 120 are respectively pivoted to a first pivot point 201 and a second pivot point 202 on the base part 200 of the two-wheeled vehicle, wherein the first and second pivot points 201, 202 are at different locations on the base part 200 of the two-wheeled vehicle.

In addition, as can be seen in FIGS. 4 and 6, the length of the first link 110 is configured to be shorter than that of the second link 120, and when the side stand 100 is moved between the propping state and the collapsed state, the pivot angles of the first link 110 and the second link 120 do not exceed 360 degrees. Limiting pivot angles of the first and second links 110, 120 to not greater than 360 degrees can be achieved through use of the first and second links 110, 120 with different lengths, or through placement of a stopper at one pivot point (e.g., at the first pivot point 201 or the second pivot point 202). As such, the stand 130 has a pivot angle that does not exceed 360 degrees, and is only rotatable between the housing body 300 and the ground 500 (i.e., changed between the closed and open states).

More specifically, a surface 133 of the stand 130 and (the surface of) the housing body 300 can form an angle θ. When the stand 130 is in the open state, the angle θ is less than 90 degrees; when the stand 130 is in the closed state, the angle θ is about 180 degrees. In other words, the pivot angle (i.e., the angle θ) of the stand 130 can be changed between slightly less than 90 degrees and 180 degrees.

Through the structural configuration among the first link 110, the second link 120 and the stand 130, the minimal distance d1 (as shown in FIG. 6) between the stand 130 in the closed state and the base part 200 of the two-wheeled vehicle would be less than the minimal distance d2 (as shown in FIG. 4) between the stand 130 in the open state and the base part 200 of the two-wheeled vehicle. Alternatively, in one embodiment, when the stand 130 of the side stand 100 is transformed from the open state to the closed state, not only the angle θ is changed between the stand 130 and the housing body 300 from slightly less than 90 degrees to about 180 degrees, but also the stand 130 is moved to be in close proximity with the base part 200 of the two-wheeled vehicle, so that the stand 130 can incorporate into or combine with the housing body 300 to form a smooth appearance.

Specifically, when the side stand 100 transforms from the propping state to the collapsed state (for example, from the state as shown in FIG. 4 to that as shown in FIG. 6), the first link 110 will transform from a position being perpendicular to the (outer) surface of the housing body 300 to another position being parallel to the surface of the housing body 300 (and the ground 500). Due to the structural configuration and relationships among the first link 110, the second link 120 and the stand 130, when the first link 110 is moved to parallel to the surface of the housing body 300, the pivot end 131 (including the first and second sections 131*a*, 131*b*) of the stand 130 is also moved to parallel the surface of the housing body 300, and the pivot end 131 is superimposed upon part of the first link 110. Accordingly, in the direction that is perpendicular to the surface of the housing body 300 (and the ground 500), the distance between the pivot end 131 of the stand 130 and the base part 200 in the closed state is less than the distance between the pivot end 131 of the stand 130 and the base part 200 in the open state. Further, in the direction that is parallel to the surface of the housing body 300, the pivot end 131 of the stand 130 moves away from the second pivot point 202.

For example, referring to FIGS. 4 and 6 together, if the first section 131*a* on the pivot end 131 of the stand 130 is viewed from the first pivot point 201 used as a fixed reference point and in the direction that is perpendicular to the ground 500 (and the surface of the housing body 300), when the stand 130 transforms from the open state to the closed state (from the state as shown in FIG. 4 to that as shown in FIG. 6), the first section 131*a* is moved from a position that is distant slightly larger than the minimal distance d2 to a position where the first section 131*a* and the first pivot point 201 are closely adjacent to each other. While viewed in the direction that is parallel to the surface of the housing body 300, the first section 131*a* is changed from a position where it is closely adjacent to the first pivot point 201 and located between the first and second pivot points 201, 202, to a position where it is closely adjacent to the first pivot point 201 and distant from the second pivot point 202.

Accordingly, compared to the open state, in the closed state the first link 110 and the stand 130 substantially abut against the base part 200 of the two-wheeled vehicle, as the pivot end 131 of the stand 130 is closer to the base part 200 in the perpendicular direction and is distant from the second pivot point 202.

Furthermore, when the stand 130 is in the closed state, the surface 133 of the stand 130 forms a smooth appearance with the surface of the housing body 300. As shown in FIGS. 5 and 6, since the surface 133 and the housing body 300 both have a smooth surface, in the closed state the surfaces can be visually extended to form a single imaginary smooth surface. Because toward the closed state the stand 130 comes to substantially abut against the base part 200 of the two-wheeled vehicle and moves toward the direction away from the second pivot point 202 in the parallel direction, the gaps G1 and G2 between the stand 130 and the housing body 300 can be configured to be smaller than those in the prior art. As a result, viewing the surface 133 of the stand 130 and the surface of the housing body 300 as a whole, the surface 133 of the stand 130 and the surface of the housing body 300 would be very similar to said imaginary smooth surface, such that they present an integrally smooth appearance in visual effect.

Figure 7:
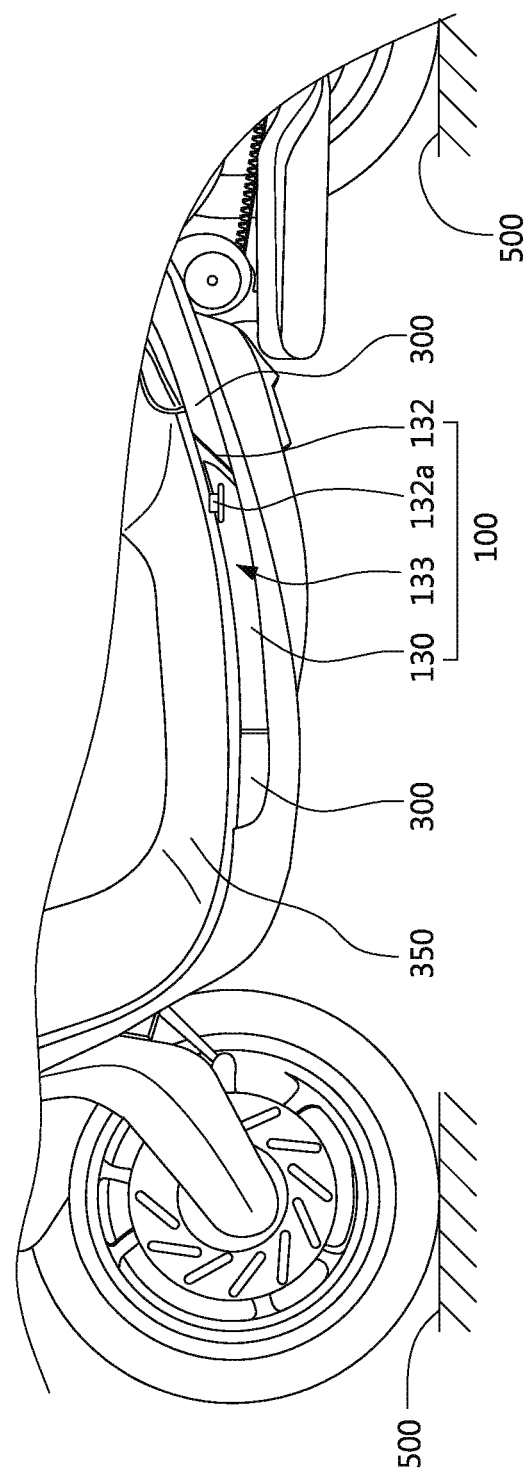
FIG. 7 is a schematic view illustrating a side stand in a collapsed state, in accordance with one practical embodiment of the present invention.
Figure 8:
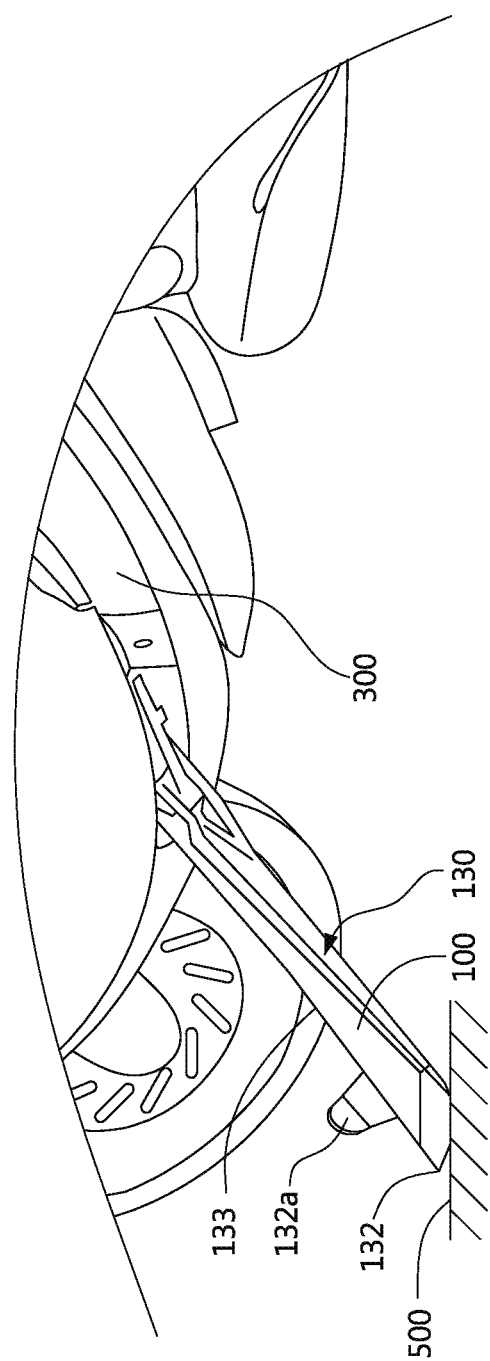
FIG. 8 is a schematic view illustrating a side stand in a propping state, in accordance with one practical embodiment of the present invention.

FIGS. 7 and 8 are schematic views respectively illustrating a side stand in a collapsed state and a propping state, in accordance with one practical embodiment of the present invention. In the present embodiment, the two-wheeled vehicle is a motorcycle or scooter. In the embodiment as illustrated in FIG. 7, the side stand 100 can be pivoted to the two-wheeled vehicle at a lateral side (or a lateral side nearer to the ground) of a foot resting part 350 for placement of a driver's feet when riding, wherein the stand 130 in the closed state combines with the housing body 300 to form a smooth appearance. In addition, as shown in FIGS. 7 and 8, the stand 130 may further include a protrusion part 132a. The protrusion part 132a may be disposed on the surface 133 of the stand 130 near the lower end 132. A driver of the two-wheeled vehicle can thus control the stand 130's being in the closed state or the open state through said protrusion part 132a (e.g., by pulling or kicking). As an alternative, the two-wheeled vehicle may include a control element for receiving an internal signal from the two-wheeled vehicle or an external signal, and the opening and closing of the stand 130 can be controlled based on said signal, but the present invention is not limited to this specific embodiment.

What is claimed is:

1. A side stand pivotally mounted on a base part of a two-wheeled vehicle, the side stand configured for supporting the two-wheeled vehicle on a ground, the two-wheeled vehicle comprising a housing body, the side stand comprising:
   a first link comprising a first end and a second end, the first end of the first link is pivoted to the base part of the two-wheeled vehicle;
   a second link having a first end and a second end, wherein the first end of the second link is pivoted to the base part of the two-wheeled vehicle; and
   a stand having a lower end and a pivot end,
   wherein the second end of the first link and the second end of the second link are pivoted to the pivot end of the stand of the side stand;
   wherein the lower end of the stand of the side stand can engage the ground when the side stand is in an open state;
   wherein the side stand is disposed between a front wheel and a rear wheel of the two-wheeled vehicle; and
   wherein the stand of the side stand includes a surface, wherein the surface of the stand of the side stand and a surface of the housing body of the two-wheeled vehicle form a smooth appearance when the side stand is selectively positioned in a closed state.

2. The side stand of claim 1, wherein the pivot end of the stand comprises a first section and a second section, wherein the first section is more distant from the center of gravity of the stand than the second section.

3. The side stand of claim 2, wherein the second end of the first link is pivoted to the first section of the pivot end, and the second end of the second link is pivoted to the second section of the pivot end.

4. The side stand of claim 3, wherein the first end of the first link is pivoted to a first pivot point on the base part of the two-wheeled vehicle, and the first end of the second link is pivoted to a second pivot point on the base part of the two-wheeled vehicle.

5. The side stand of claim 4, wherein the first and second pivot points are at different locations on the base part of the two-wheeled vehicle.

6. The side stand of claim 1, wherein an angle is formed between the surface of the stand and the housing body when the stand is in the closed state, wherein the angle is 180 degrees.

7. The side stand of claim 1, wherein an angle is formed between the surface of the stand and the housing body when the stand is in the open state, wherein the angle is less than 90 degrees.

8. The side stand of claim 1, wherein the lower end of the stand comprises a protrusion part.

9. A side stand of a two-wheeled vehicle, wherein the two-wheeled vehicle comprises a housing body, the side stand comprising:
   a stand adapted to support the two-wheeled vehicle on a ground when in an open state; and two links, wherein each of the two links is pivoted to the stand of the side stand and the two-wheeled vehicle,
   wherein the two links are used to allow the stand of the side stand to rotate from the open state in a vertical position and move to a closed state to a position linearly relative to the two-wheeled vehicle;
   wherein the side stand is disposed between a front wheel and a rear wheel of the two-wheeled vehicle;
   wherein the stand of the side stand comprises a surface, wherein the surface of the stand of the side stand and a surface of the housing body of the two-wheeled vehicle form a smooth appearance when the side stand is selectively positioned in the closed state.

10. The side stand of claim 9, wherein at least one of the two links is used to restrict the rotation of the stand to an angle less than 180 degrees.

* * * * *